UNITED STATES PATENT OFFICE.

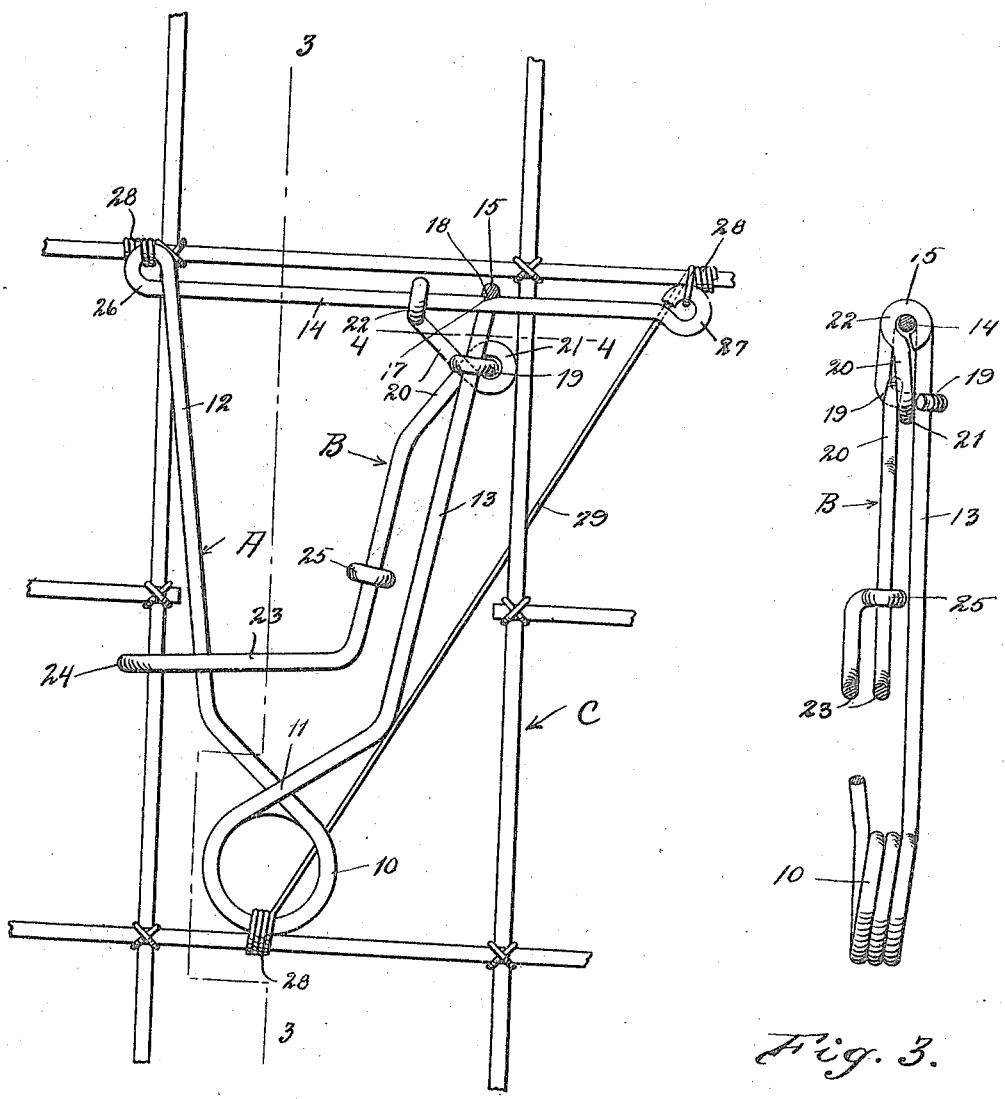

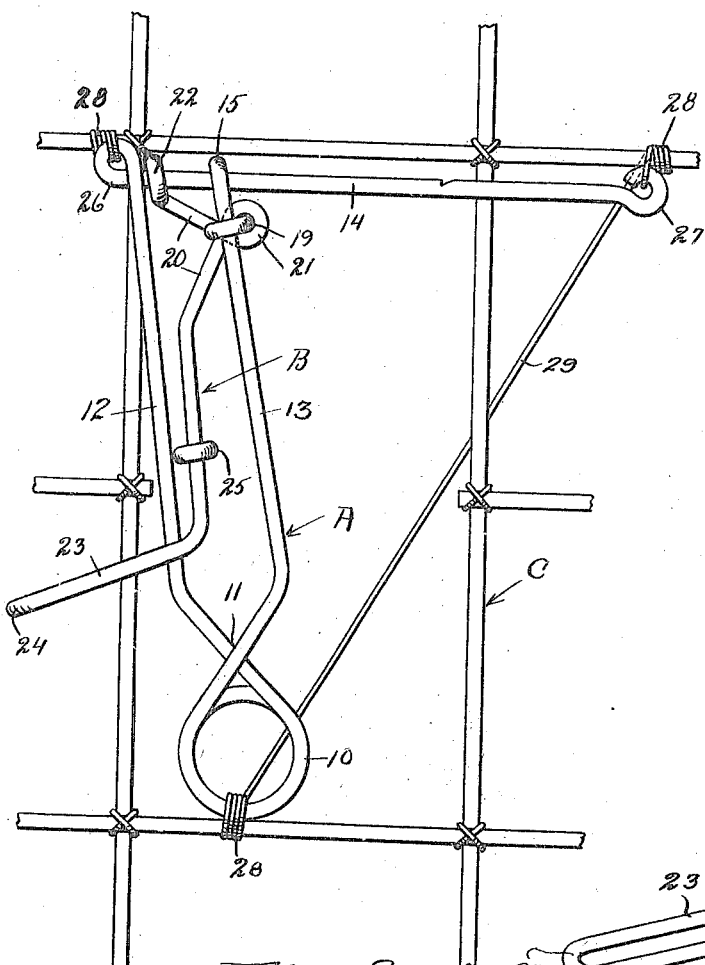
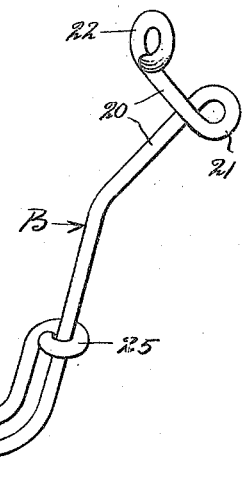
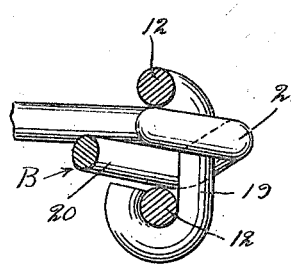

CARL EDGAR, OF CORD, OREGON.

TRAP.

1,264,033. Specification of Letters Patent. Patented Apr. 23, 1918.

Application filed July 13, 1917. Serial No. 180,476.

*To all whom it may concern:*

Be it known that I, CARL EDGAR, a citizen of the United States, residing at Cord, in the county of Malheur and State of Oregon, have invented new and useful Improvements in Traps, of which the following is a specification.

This invention relates to traps, and is admirably designed to be supported upon a wire fabric fence or other support for the purpose of trapping rabbits, although it is susceptible for all uses where small traps can be used, and its general application is contemplated by the claims.

It is my purpose to construct a trap embodying the desired features of simplicity and durability, the trap consisting of but two parts formed from wire, and so designed and associated to provide a trap both efficient and positive in its operation.

The nature and advantages of the invention will be readily apparent when the following detail description is read in connection with the accompanying drawings, the invention residing in the construction, combination and arrangement of parts as claimed.

In the drawings forming part of this specification like numerals of reference indicate similar parts in the several views and wherein:—

Figure 1 is a side elevation of a trap, showing the same supported upon a wire fence.

Fig. 2 is a view showing the active position of parts.

Fig. 3 is a sectional view taken on line 3—3 of Fig. 1.

Fig. 4 is an enlarged fragmentary sectional view on the line 4—4 of Fig. 1.

Fig. 5 is a perspective view of the trigger.

A trap constructed in accordance with my invention essentially embodies two parts, a frame or trap body indicated generally at A, and a trigger indicated generally at B, both of which parts are preferably constructed from wire.

The frame A as shown is substantially V-shaped in formation, being constructed from resilient wire or other suitable material, and formed at the apex thereof with a resilient coil 10. The terminals of the convolutions of the coil are crossed as at 11 so that the limbs 12 and 13 respectively have a normal tendency to move toward each other into gripping relation. The limb 12 terminates to provide a transversely disposed member 14 which extends across the open end of the frame, and also an appreciable distance beyond the limb 13. The free extremity of the limb 13 is looped about the transverse member as clearly indicated at 15, the loop coöperating with the member 14 to maintain the limbs separated. While this may be accomplished in various ways, the member 14 is preferably notched as at 17 at an appropriate point in its length, while the bend at the free end of the limb 13 in providing the loop 15, is beveled as at 18, and when this beveled portion is received within the notch 17, the limb 13 is held separated from the limb 12 as will be readily understood. The extremity of the material defining the loop 15 is bent at right angles as at 19 in the direction of the limb 13 and coiled about the latter as shown. The right angular extension 19 provides for the pivotal mounting of the trigger B, and the positioning of the latter so that it is susceptible of effecting a release of the limb 13 from the member 14 in the manner to be hereinafter described.

The trigger B is formed from a single strand of wire, and has one extremity of substantially V-shaped formation as indicated at 20, the apex of said portion being formed to provide a loop 21 which encircles the extension 19 whereby the trigger is mounted for pivotal movement. The terminal of the V-shaped portion 20 is formed to provide an eye 22 which encircles the member 14, and capable of sliding movement upon the latter to permit the limb 13 to assume a position in gripping relation with respect to the limb 12, when the trigger is actuated. The trigger as shown is positioned between the limbs 12 and 13 of the frame and has an offset extremity 23 the material of which is bent upon itself to provide a loop 24 the terminal of which is coiled about the body of the trigger as shown at 25. The loop 24 slidably embraces the limb 12, and in the normal position of parts, the loop 24 is of such length as to project beyond both sides of the limb 12, providing a reasonably large actuating extremity.

As hereinabove stated the trap is primarily designed for use in connection with a wire fabric fence, herein indicated generally at C, or in conjunction with some other suitable support. With a view of providing means for conveniently and easily mounting the trap as a whole I provide a loop 26 at the point of juncture of the limb 12 with the member 14, while the free extremity of the latter also terminates to provide a loop 27. Passed through the loops 26 and 27, and also through the coil 10 of the frame are wire ties 28, the latter being wrapped about the adjacent strand of the fence structure for the purpose of supporting the trap thereon. It will be noted that the trap is thus secured to the fence at three points, which latter are disposed in triangular relation whereby the trap is immovably held in position. If desired a wire brace 29 may connect the wire ties 28 between the loop 27 and coil 10, this brace forming part of the respective ties. When the trap is thus mounted upon the fence or other support, the limb 12 of the frame is held fixed with respect thereto and to the limb 13, while the latter is permitted movement toward and away from the limb 12.

In practice, the limb 13 is separated from the limb 12 until the beveled portion 18 of the loop 15 is received within the notch 17, whereupon the limb 13 is held fixed in its inactive position as clearly shown in Fig. 1. The trigger B is mounted upon the limb 13 for movement therewith, while the eye 22 by reason of its association with the member 14 maintains the trigger in the position shown. When the animal steps upon the loop 24 constituting the actuating extremity of the trigger, or crowds the trigger to one side, the loop is depressed imparting a slight pivotal movement to the trigger as a whole. When the trigger is thus moved in this manner, the loop 15 is slightly elevated and the member 14 slightly lowered to effect a release of the limb 13, to permit the latter under the influence of the resilient coil 10 to move forcibly in the direction of the limb 12 for the purpose of trapping the animal between the respective limbs of the frame. The trap is not only simple in construction, but very positive in its operation. The coöperation between the loop 15 and the member 14, influenced by the trigger B renders the trap very sensitive, so that the limb 13 will be quickly released from the member with a very slight movement of the trigger.

While it is believed that from the foregoing description the nature and advantages of the invention will be readily apparent, I desire to have it understood that what is herein shown and described, is merely illustrative of the preferred embodiment of the invention, which I do not consider restrictive, inasmuch as such changes may be resorted to when desired as fall within the scope of what is claimed.

What is claimed is:—

1. A trap constructed from resilient material and embodying a substantially V-shaped frame, a resilient coil formed at the apex thereof, a transverse member extending across the open end of the frame and rigidly connected with one limb thereof, the other limb having a terminal loop slidably mounted on said member, and said member being provided with a notch to receive said loop whereby said limbs are held separated, and a trigger mounted to effect a release of the second mentioned limb when actuated.

2. A trap constructed from resilient material and embodying a substantially V-shaped frame, a resilient coil formed at the apex thereof, a transverse member extending across the open end of the frame and forming a continuation of one of the limbs thereof, the other limb having a terminal loop slidably mounted upon said member and adapted to coöperate with the latter to hold said limbs separated, a trigger pivotally mounted upon the second mentioned limb and coacting therewith and with said member to effect a release of said limb, and said trigger having an offset looped extremity normally positioned between the limbs and straddling the first mentioned limb.

3. In a trap, the combination with a support, of a substantially V-shaped frame, a spring coil formed at the apex thereof, a transverse member extending across the open end of the frame and forming a continuation of one of the limbs thereof, the other limb having a terminal loop slidable on said member and coöperating therewith to maintain said limbs separated, means for securing the frame to the support whereby the first mentioned limb is held fixed relative to the other limb, and a trigger mounted to coöperate with the second mentioned limb to effect a release of the latter, whereby said limb assumes a position in gripping relation with the other limb.

4. In a trap, the combination with a support, of a substantially V-shaped frame, a resilient coil formed at the apex thereof, a transverse member extending across the open end of the frame and forming a continuation of one of the limbs thereof, the other limb having a terminal loop slidable on said member and coöperating therewith to maintain the limbs separated, said member defining an eye at its point of juncture with the first mentioned limb, and terminating to provide a second eye, means for securing said eyes and resilient coil to the support whereby the frame is held in position thereon with the first mentioned limb fixed relative to the second mentioned limb, and a trigger mounted to coöperate with the second mentioned limb and said member to effect a release of said limb when the trigger is actuated.

5. A trap constructed from resilient material and embodying a frame including normally spaced limbs, a resilient coil providing a connection between said limbs at one end thereof, a transverse member extending across the open end of the frame and forming a continuation of one of said limbs, the other limb coöperating with said member to maintain said limbs separated, a trigger pivotally associated with the last mentioned limb, said trigger being terminally looped and surrounding said member, whereby said member and said last mentioned limb are moved away from each other to effect a release of said limb when the trigger is actuated.

In testimony whereof I affix my signature.

CARL EDGAR.

Copies of this patent may be obtained for five cents each, by addressing the "Commissioner of Patents, Washington, D. C."